Jan. 22, 1957 M. REGLE ET AL 2,778,384
LATTICE FORMING MACHINE
Filed April 5, 1952 3 Sheets-Sheet 1

INVENTORS.
Marius Réglé
Louis Lemaire
By Moore, Olson & Trexler
attys.

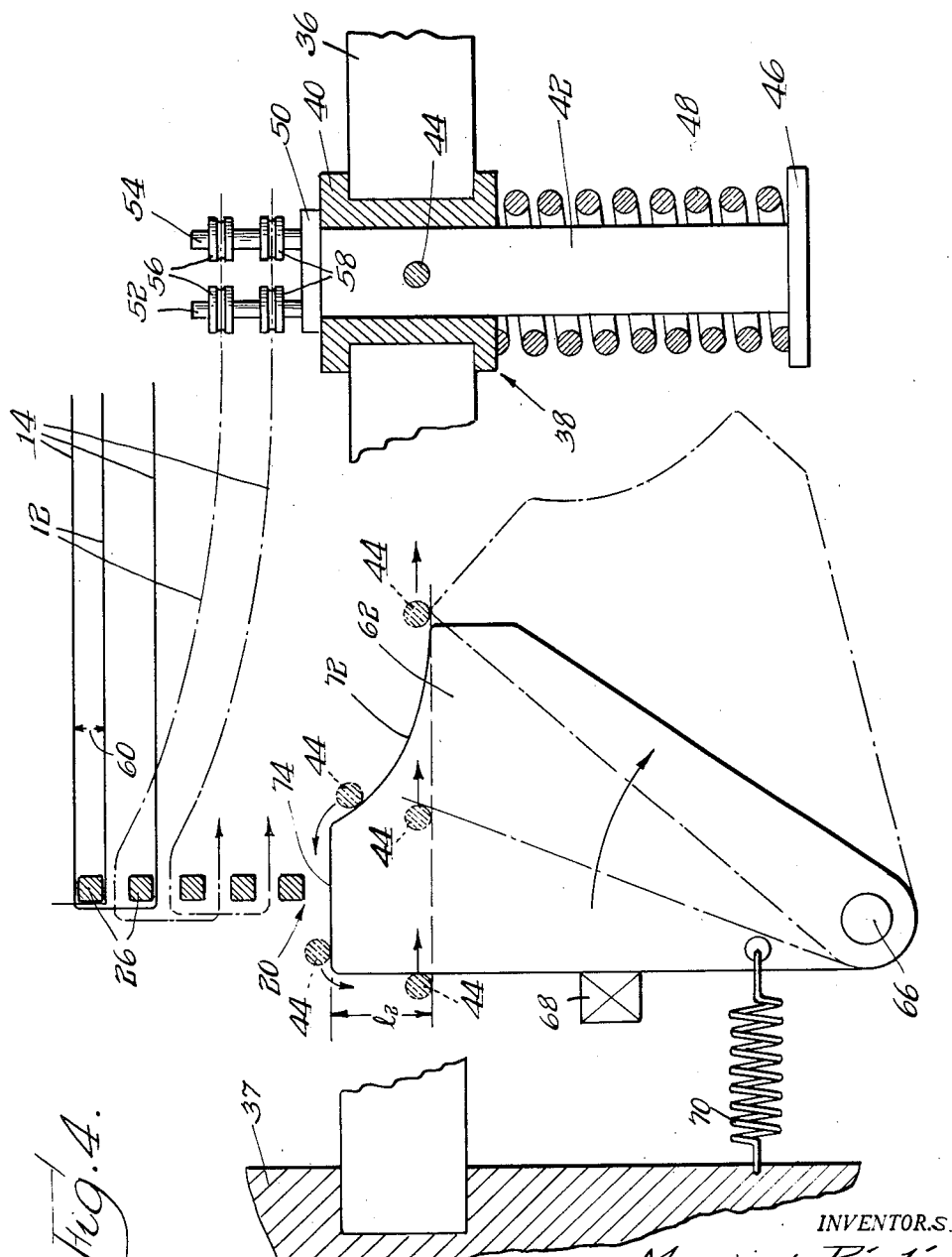

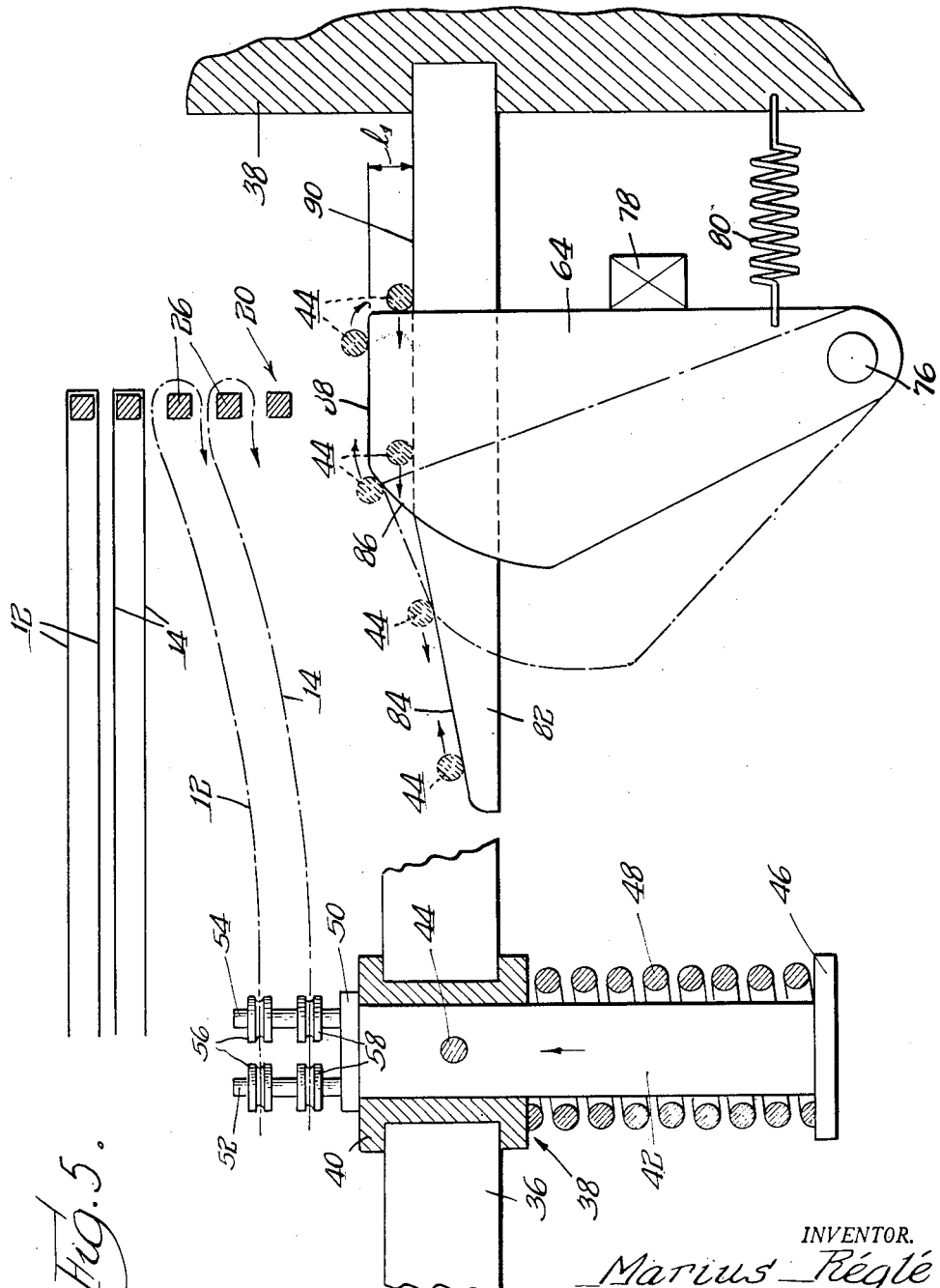

United States Patent Office 2,778,384
Patented Jan. 22, 1957

2,778,384

LATTICE FORMING MACHINE

Marius Regle and Louis Lemaire, Paris, France, assignors to Welding Research, Inc., Chicago, Ill., a corporation of Illinois Application April 5, 1952, Serial No. 280,742

8 Claims. (Cl. 140—3)

This invention is concerned with a machine for making metal lattices for use in reenforcing window glass, etc.

In prior known machines of this character, there has been provided a pair of endless chains in parallel, spaced apart relation and having outward projections or teeth thereon. A shuttle has been provided with means for oscillating it back and forth between the chains for looping a woof thread of steel or other metal wire over the projections or teeth on the elongated chains. Such machines have been capable of looping only one woof thread at a time over the projections or teeth on the chains and the yield of lattices therefore has been low.

An object of this invention is to provide a machine for concurrently distributing a plurality of woof threads from a shuttle onto projections or teeth of endless thread receiving chains.

A more particular object of this invention is to provide a machine for concurrently distributing two woof threads to produce metal lattices at a higher rate than heretofore thought possible.

Another object of this invention is to provide, in a lattice making machine, means for concurrently distributing a plurality of woof threads from a shuttle onto thread receiving chains by oscillating the shuttle longitudinally of the chains a different distance adjacent each chain according to the number of woof threads distributed and the step or longitudinal distance between woof threads.

Other objects and advantages of the present invention will be apparent from the following description when taken in connection with the accompanying drawings wherein:

Fig. 4 is an enlarged top view of a fragment of the machine showing the operation of the shuttle adjacent one chain; and Fig. 5 is a view similar to Fig. 4 showing the operation of the shuttle adjacent the other chain.

Figure 1:
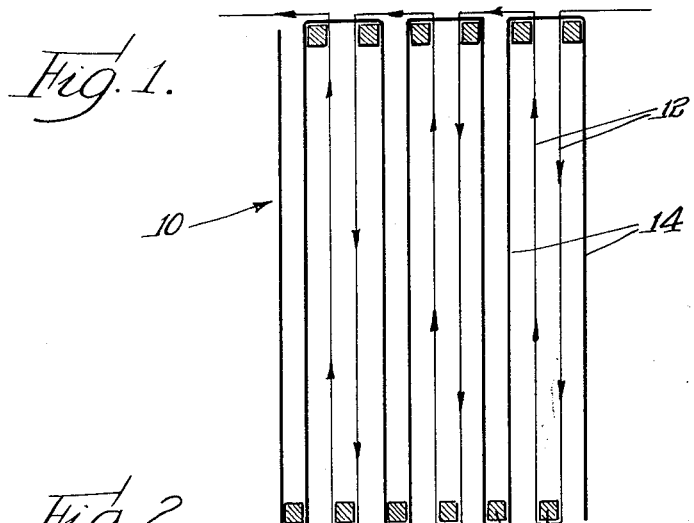
Fig. 1 is a top view of the meshed woof threads.
Figure 2:
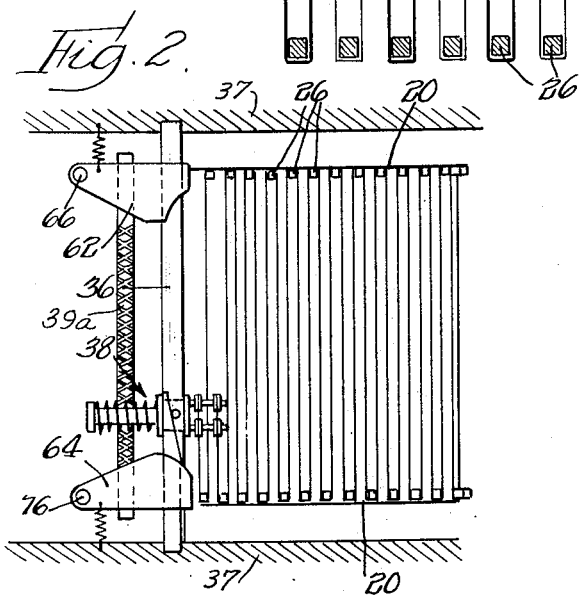
Fig. 2 is a top view of a lattice making machine embodying the principles of my invention.

Referring first to Fig. 1, there will be seen a section 10 of woof threads 12 and 14. A lattice may be formed by orienting a section of woof threads at right angles to another such section in overlapping relation and then welding the same together. The welding may be effected electrically or by any other well known means.

Figure 3:
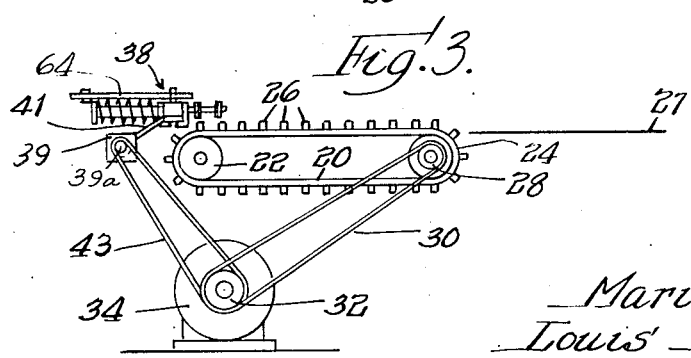
Fig. 3 is a side view of the machine.

A machine for setting up the woof threads shown in Fig. 1 is shown generally in Figs. 3 and 4 and includes a pair of endless chains 20 passed over pairs of sprocket wheels 22 and 24 with the reaches of the chains in parallel, spaced apart relation. The chains 20 are provided with outward projections or teeth 26 for receiving woof threads 12 and 14. The woof threads 12 and 14 pass from the chains onto a table 27 or the like. The sprocket wheels 24 are fixed for rotation with a pulley 28 and this pulley is driven by means such as a belt 30 extending from a drive pulley 32 on a motor 34.

The machine further is provided with a transverse bar 36 extending between fixed side wall or frame members 37 positioned substantially above the pair of sprocket wheels 22. A shuttle 38 is reciprocably mounted on the bar 36. Suitable mechanism is linked to the shuttle for reciprocating the shuttle and is driven by a belt 43 on the motor pulley 32. By way of illustration, but not by way of limitation, the mechanism might be a double worm and nut such as is found in fishing reels or the like, such as in the United States patents to J. M. Holahan, Jr., 2,652,212, and E. Myette, 1,233,106, or as in the double worm shuttle drive of Bigsby, 234,521, or any other suitable mechanism for providing reciprocating motion from a rotary drive source. Thus, a nut or carrier 39 is mounted on a double worm 39a which is driven by the belt 43 to traverse the nut back and forth between the thread receiving means and a link 41 connects the nut or carrier 39 to the shuttle mechanism for imparting similar reciprocating movement thereto. Since the belts 30 and 43 are driven from the same pulley assembly, it is obvious that the endless chains 20 and the shuttle are driven in predetermined timed relationship.

The shuttle as seen more particularly in Figs. 4 and 5 comprises a block 40 mounted reciprocably on the bar 36. A cylinder or handle 42 fits slidingly through the block 40 and is provided with a transverse stud or cam follower member 44 fitting through an elongated slot (not shown) in the block 40. The outer end of the cylinder or handle 42 is provided with a flange 46, and a coil spring 48 is compressed between this flange and a face on the block 40. A flange 50 on the opposite end of the cylinder or handle 42 retains the cylinder in the block 40 against the force of the spring 48.

The cylinder 42 is provided with a pair of axially extending, spaced apart spindles 52 and 54 on which are mounted pairs of guide rollers 56 and 58. The guide grooves of the guide rollers 56 and 58 are spaced twice the step or distance 60 between adjacent woof threads 12, 14. The wire woof threads 12 and 14 pass between these rollers from a pair of supply spools (not shown) carried above the machine. When the shuttle is moving to the left, the guide rollers 56 and 58 on the spindle 54 guide the wire threads 12 and 14, while the guide rollers 56 and 58 on the spindle 52 guide the wire threads while the shuttle is moving to the right.

To distribute the two woof threads 12 and 14 simultaneously and to loop or buckle them about the teeth or projections 26 on the chains 20, it is necessary to provide for a cycle of oscillation which permits the imbrication of the threads from one tooth onto the other. To arrive at this result, the oscillation along the left chain 20 (Fig. 4) is of sufficient distance to cause the wire thread to loop over two teeth. Therefore, the shuttle is displaced a distance $l_2$ equal to four times the step 60 of a mesh. On the other side of the machine, along the right chain 20, the shuttle is displaced a distance $l_1$ (Fig. 5), two times the step 60 of the mesh.

This oscillation is obtained by means of cams 62 (Fig. 4) and 64 (Fig. 5). The cam 62 is pivotally mounted on a stud or the like 66 and is urged against a stop 68 by a coil spring 70 stretched between the cam and the adjacent side wall or frame member 37. The cam 62 is provided with an upwardly curved profile 72 of sufficient depth to displace the shuttle the distance $l_2$ when the stud or cam follower 44 on the shuttle cylinder 42 engages this profile of the cam 62. As the cam follower 44 leaves the profile 72, it passes onto a flat 74 so that the threads 12 and 14 are carried substantially midway between pairs of adjacent teeth 26. As the cam follower 44 leaves the flat 74, the spring 48 returns the cylinder 42 to its normal position the distance $l_2$, or four times the step 60, from its displaced position. As the shuttle 38 returns to the right, the stud 44 pivots the cam 62 out of the way as shown in dashed lines in Fig. 4 and pulls the woof threads 12 and 14 between pairs of adjacent teeth 26 with each of the woof threads 12 and 14 looped or buckled over two teeth 26.

The right cam 64 is pivoted on a stud 76 or the like and is urged against a stop 78 by a coil spring 80 stretched between the cam 64 and the side wall or frame member 37. A fixed cam 82 mounted on the side wall or frame member 37 is provided with an inclined cam profile 84 leading to a curved profile 86 on the cam 64. The fixed cam profile 84 and the cam profile 86 of the pivotal cam 64 lift the stud or cam follower 44 the distance $l_2$ to shift the shuttle that distance from its normal position. As the stud 44 passes along the flat 88, the threads 12 and 14 are pulled between pairs of adjacent teeth 26 of the right chain 20. When the stud 44 leaves the flat 88 and passes behind the cam 64, it and the shuttle 38 are returned only the distance $l_1$ by the spring 48 before the stud 44 encounters a fixed flat 90 on the cam 82. As the shuttle is returned to the left the threads 12 and 14 are passed between pairs of adjacent teeth 26 with each thread looped or buckled over only one tooth after such looping.

The concurrent distribution of two woof threads provides a high rate of woof forming, and this rate can be increased by applying the principles of our invention concurrently to distribute a greater number of threads.

It will be understood that the specific example shown and described is for illustrative purposes only and that the invention is not to be limited thereby, but is to include all that which falls fairly within the spirit and scope of the appended claims.

We claim:

1. In a lattice making machine the combination comprising a pair of thread receiving means, means supporting said pair of thread receiving means in spaced apart relation, means for moving said thread receiving means, a shuttle mounted for movement back and forth between said thread receiving means, means on said shuttle for concurrently guiding a plurality of spaced threads from said shuttle onto said thread receiving means, means for progressively feeding said guiding means relatively transversely of the back and forth movement of said shuttle, and cam means for periodically oscillating said guiding means and said thread receiving means relatively transversely of and adjacent opposite ends of the back and forth movement of said shuttle to loop said threads on said thread receiving means, said cam means including a cam pivotally mounted adjacent one of said thread receiving means and adapted to oscillate said guiding means a predetermined distance, said cam pivoting away from the path of said shuttle when said shuttle moves past in one direction, a fixed cam adjacent the other of said thread receiving means, and a cam pivotally mounted adjacent said fixed cam, said fixed cam and adjacent pivotally mounted cam cooperating to oscillate said guiding means a lesser distance adjacent the second thread receiving means than the guiding means is oscillated adjacent the first thread receiving means, said adjacent pivotally mounted cam pivoting out of the way when said shuttle moves past it in a given direction.

2. In a lattice making machine for concurrently distributing a plurality of spaced apart threads on thread receiving means, the combination comprising shuttle means mounted for reciprocating movement along a predetermined path of travel, spaced thread receiving means mounted for movement substantially transversely of the said predetermined path of travel of said shuttle means, means for moving said thread receiving means, spaced guide means on said shuttle means disposed for concurrently guiding a plurality of continuous threads spaced apart laterally in the direction of movement of said thread receiving means, and means adjacent each end of the path of travel of the shuttle means for shifting said guide means transversely of the said predetermined path of travel of the shuttle means in different amounts at opposite ends thereof adjacent the thread receiving means for looping the threads on said thread receiving means in spaced relation.

3. In a lattice making machine as claimed in claim 2, wherein the means for shifting the guide means comprises cam means disposed adjacent each end of the path of travel of the shuttle means.

4. In a lattice making machine as claimed in claim 3, wherein the cam means are pivotally mounted for retraction from operative position out of the path of the guide means on each return stroke of the shuttle means.

5. In a lattice making machine as claimed in claim 4, wherein spring means are provided to return the cam means to operative position.

6. In a lattice making machine as claimed in claim 2, wherein the spaced thread receiving means include a plurality of spaced projections over which the threads are to be looped, and wherein the means for shifting the guide means is such as to loop each thread over one projection at one end of the path of travel of the shuttle means and over more than one projection at the other end of said path of travel of the shuttle means.

7. In a lattice making machine as claimed in claim 2, wherein the guide means is slidably mounted on said shuttle means and spring urged in one direction, and wherein cam means are provided for shifting the guide means transversely of the path of travel of the shuttle means in the opposite direction.

8. In a lattice making machine as claimed in claim 2, wherein the means for shifting the guide means comprises cam members pivotally mounted adjacent the ends of the path of travel of the shuttle means, and wherein the guide means has mounted thereon a cam follower engageable with said cam means to shift the guide means in one direction as the shuttle means approaches each end of its path of travel and operating to rock the cam means out of the path of travel of said follower as the shuttle means reverses its movement.

References Cited in the file of this patent

UNITED STATES PATENTS

| Number | Name | Date |
|---|---|---|
| 628,253 | Pendergast | July 4, 1899 |
| 1,282,171 | Barnes | Oct. 22, 1918 |
| 1,908,050 | Reed | May 9, 1933 |
| 1,945,890 | Gaskell | Feb. 6, 1934 |
| 1,961,991 | Southwell | June 5, 1934 |
| 2,027,806 | Bird | Jan. 14, 1936 |
| 2,040,925 | Dreyfus | May 19, 1936 |
| 2,077,061 | White | Apr. 13, 1937 |
| 2,160,715 | Blaisdell | May 30, 1939 |
| 2,294,369 | Harter | Sept. 1, 1942 |